(12) United States Patent
Abe

(10) Patent No.: US 11,190,047 B2
(45) Date of Patent: Nov. 30, 2021

(54) UNINTERRUPTIBLE POWER SUPPLY SYSTEM INCLUDING A PLURALITY OF UNINTERRUPTIBLE POWER SUPPLIES CONNECTED IN PARALLEL

(71) Applicant: TOSHIBA MITSUBISHI-ELECTRIC INDUSTRIAL SYSTEMS CORPORATION, Chuo-ku (JP)

(72) Inventor: Shoichi Abe, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 0 days.

(21) Appl. No.: 16/623,805

(22) PCT Filed: Jun. 28, 2017

(86) PCT No.: PCT/JP2017/023697
§ 371 (c)(1),
(2) Date: Dec. 18, 2019

(87) PCT Pub. No.: WO2019/003332
PCT Pub. Date: Jan. 3, 2019

(65) Prior Publication Data
US 2020/0177021 A1 Jun. 4, 2020

(51) Int. Cl.
*H02J 9/00* (2006.01)
*H02J 9/06* (2006.01)
(52) U.S. Cl.
CPC .................... *H02J 9/062* (2013.01)
(58) Field of Classification Search
CPC ...................... H02J 9/00; H02J 3/00
See application file for complete search history.

(56) References Cited

U.S. PATENT DOCUMENTS

2005/0036253 A1* 2/2005 Tian .................. H02J 3/38
361/66
2007/0210652 A1 9/2007 Tracy et al.
(Continued)

FOREIGN PATENT DOCUMENTS

JP H0513740 B2 * 2/1993 ............. B21K 1/08
JP 5-130740 A 5/1993
(Continued)

OTHER PUBLICATIONS

International Search Report dated Sep. 26, 2017 in PCT/JP2017/023697 filed on Jun. 28, 2017, 2 pages.
(Continued)

*Primary Examiner* — Hal Kaplan
*Assistant Examiner* — Joseph N Inge
(74) *Attorney, Agent, or Firm* — Oblon, McClelland, Maier & Neustadt, L.L.P.

(57) ABSTRACT

Each of n uninterruptible power supplies connected in parallel includes m uninterruptible power supply modules connected in parallel between an input terminal and an output terminal. In each uninterruptible power supply module, a controller controls an inverter so that the current value of AC power supplied from the inverter to a load matches a first instruction value. The n×m controllers are connected to one another to constitute an integrated controller. When a failure is detected in one of the m uninterruptible power supply modules in any one of the n uninterruptible power supplies, the integrated controller disconnects the failed uninterruptible power supply module and changes the first instruction value to a second instruction value so as to equalize the current values of AC power output from the inverters of the remaining normal uninterruptible power supply modules.

2 Claims, 13 Drawing Sheets

(56) References Cited

U.S. PATENT DOCUMENTS

| | | |
|---|---|---|
| 2010/0102636 A1 | 4/2010 | Tracy et al. |
| 2012/0013193 A1 | 1/2012 | Sato et al. |
| 2016/0020645 A1* | 1/2016 | Tracy .................. H02M 7/493 |
| | | 307/65 |

FOREIGN PATENT DOCUMENTS

| | | |
|---|---|---|
| JP | 2014-53986 A | 3/2014 |
| WO | WO 2010/119564 A1 | 10/2010 |

OTHER PUBLICATIONS

Indian Office Action dated Aug. 7, 2020 in Indian Patent Application No. 201917053302, 6 pages.
Japanese Office Action dated Sep. 23, 2020 in Japanese Patent Application No. 2019-526453 (with English translation), 8 pages.
Office Action dated May 12, 2021, in Korean Patent Application No. 10-2020-7001990, with English-language Translation.

\* cited by examiner

UNINTERRUPTIBLE POWER SUPPLY SYSTEM INCLUDING A PLURALITY OF UNINTERRUPTIBLE POWER SUPPLIES CONNECTED IN PARALLEL

TECHNICAL FIELD

The present invention relates to an uninterruptible power supply system.

BACKGROUND ART

Uninterruptible power supplies have been widely used as power supplies for stably supplying AC power to essential loads, such as computer systems. For example, WO 2010/119564 (PTL 1) discloses an uninterruptible power supply system including a plurality of uninterruptible power supplies connected in parallel. In this uninterruptible power supply system, if one uninterruptible power supply is failed, the load can still be supplied with AC power by the remaining uninterruptible power supplies.

CITATION LIST

Patent Literature

PTL 1: WO 2010/119564

SUMMARY OF INVENTION

Technical Problem

Some of the uninterruptible power supply systems have a plurality of uninterruptible power supplies each of which is constituted of a plurality of uninterruptible power supply modules connected in parallel. In such an uninterruptible power supply system, when one of the plurality of uninterruptible power supply modules is failed in any one of the plurality of uninterruptible power supplies, then the uninterruptible power supply having the failed uninterruptible power supply module is disconnected from the uninterruptible power supply system, so that the load is supplied with AC power by the remaining uninterruptible power supplies. Thus, if an uninterruptible power supply module is failed, the load can still be supplied with AC power.

However, in the above-described uninterruptible power supply system, in the uninterruptible power supply having the failed uninterruptible power supply module, the other normal uninterruptible power supply modules are also forced to be unusable. Accordingly, in each of the remaining uninterruptible power supplies, each uninterruptible power supply module needs to output increased AC power after the failure, resulting in increased power loss. This may cause an increase in power loss in the entire uninterruptible power supply system, thus reducing the operation efficiency of the uninterruptible power supply system.

Further, when the remaining uninterruptible power supplies perform control to increase their output currents, there may arise variations in output voltage among the remaining uninterruptible power supplies. This may disadvantageously cause a cross-current to flow between the output terminals of the remaining uninterruptible power supplies.

The present invention has been made to solve such a problem. An object of the present invention is to efficiently and stably supply power to a load, with an uninterruptible power supply system constituted of a plurality of uninterruptible power supplies connected in parallel, each having a plurality of uninterruptible power supply modules connected in parallel.

Solution to Problem

According to an aspect of the present invention, an uninterruptible power supply system includes n uninterruptible power supplies connected in parallel, where n is an integer of two or more. Each of the uninterruptible power supplies includes: an input terminal that receives first AC power from an AC power source; an output terminal connectable to a load; m uninterruptible power supply modules connected in parallel between the input terminal and the output terminal, where m is an integer of two or more; and m switches each connected in series to a corresponding one of the m uninterruptible power supply modules between the input terminal and the output terminal Each of the uninterruptible power supply modules includes a converter, an inverter, and a controller. The converter converts the first AC power supplied from the AC power source, into DC power. The inverter converts the DC power into second AC power, and supplies the second AC power to the load. The controller controls the inverter so that a current value of the second AC power supplied from the inverter to the load matches a first instruction value. The n×m controllers are connected to one another to constitute an integrated controller. When a failure is detected in one of the m uninterruptible power supply modules in any one of the n uninterruptible power supplies, the integrated controller opens the switch connected to the uninterruptible power supply module having the failure. The integrated controller then changes the first instruction value to a second instruction value so as to equalize the current values of the second AC power among the remaining normal uninterruptible power supply modules.

Advantageous Effects of Invention

The present invention can provide an uninterruptible power supply that can efficiently supply power to a DC load and collect regenerative power generated at the DC load.

DESCRIPTION OF EMBODIMENTS

Hereinafter embodiments of the present invention are described in detail with reference to the drawings. Identical or corresponding parts are denoted by identical reference signs, and the redundant description is not repeated.

Embodiment 1

Figure 1:
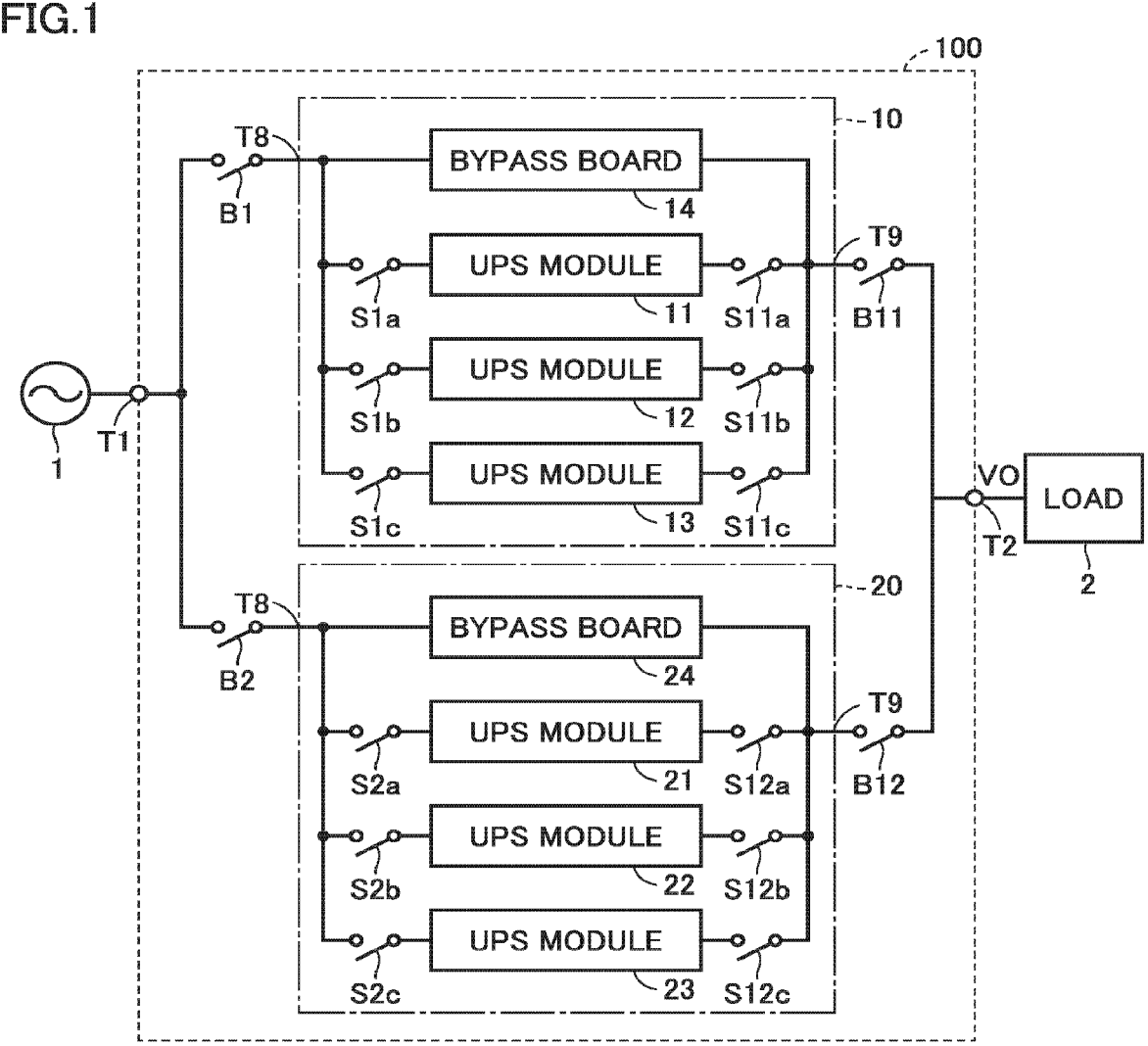
FIG. 1 is a circuit block diagram showing a configuration of an uninterruptible power supply system according to embodiment 1 of the present invention.

FIG. 1 is a circuit block diagram showing a configuration of an uninterruptible power supply system 100 according to embodiment 1 of the present invention. With reference to FIG. 1, uninterruptible power supply system 100 according to embodiment 1 is connected between an AC power source 1 and a load 2, so that uninterruptible power supply system 100 can supply AC power to load 2.

AC power source 1 is, for example, a commercial AC power source that supplies uninterruptible power supply system 100 with AC power having a commercial frequency (first AC power). Actually, three-phase AC power is supplied from AC power source 1 to uninterruptible power supply system 100. For simplicity of the drawing and the explanation, however, FIG. 1 shows a circuit for only a single phase.

Load 2 is, for example, an electrical device that is driven by AC power. Load 2 is driven by AC power supplied from uninterruptible power supply system 100 (second AC power).

Uninterruptible power supply system 100 includes an input terminal T1 and an output terminal T2. Input terminal T1 receives AC power from AC power source 1. Output terminal T2 is connected to load 2. Load 2 can operate on AC power supplied from uninterruptible power supply system 100.

Uninterruptible power supply system 100 further includes n uninterruptible power supplies 10, 20 (n is an integer of two or more) and breakers B1, B2, B11, B12. In FIG. 1, uninterruptible power supply system 100 includes two uninterruptible power supplies 10, 20 (n=2). Two uninterruptible power supplies 10, 20 are connected in parallel between input terminal T1 and output terminal T2.

Breaker B1 is connected between input terminal T1 and input terminal T8 of uninterruptible power supply 10. Breaker B11 is connected between output terminal T9 of uninterruptible power supply 10 and output terminal T2. Breaker B2 is connected between input terminal T1 and input terminal T8 of uninterruptible power supply 20. Breaker B12 is connected between output terminal T9 of uninterruptible power supply 20 and output terminal T2.

Uninterruptible power supply 10 includes input terminal T8, output terminal T9, m uninterruptible power supply modules 11 to 13, a bypass board 14, switches S1a, S1b, S1c, S11a, S11b, S11c, and m batteries B. In FIG. 1, uninterruptible power supply 10 includes three uninterruptible power supply modules 11 to 13 and three batteries B (m=3). Uninterruptible power supply modules 11 to 13 and bypass board 14 are connected in parallel between input terminal T8 and output terminal T9. Hereinafter an uninterruptible power supply module is referred to as an "UPS module".

Figure 2:
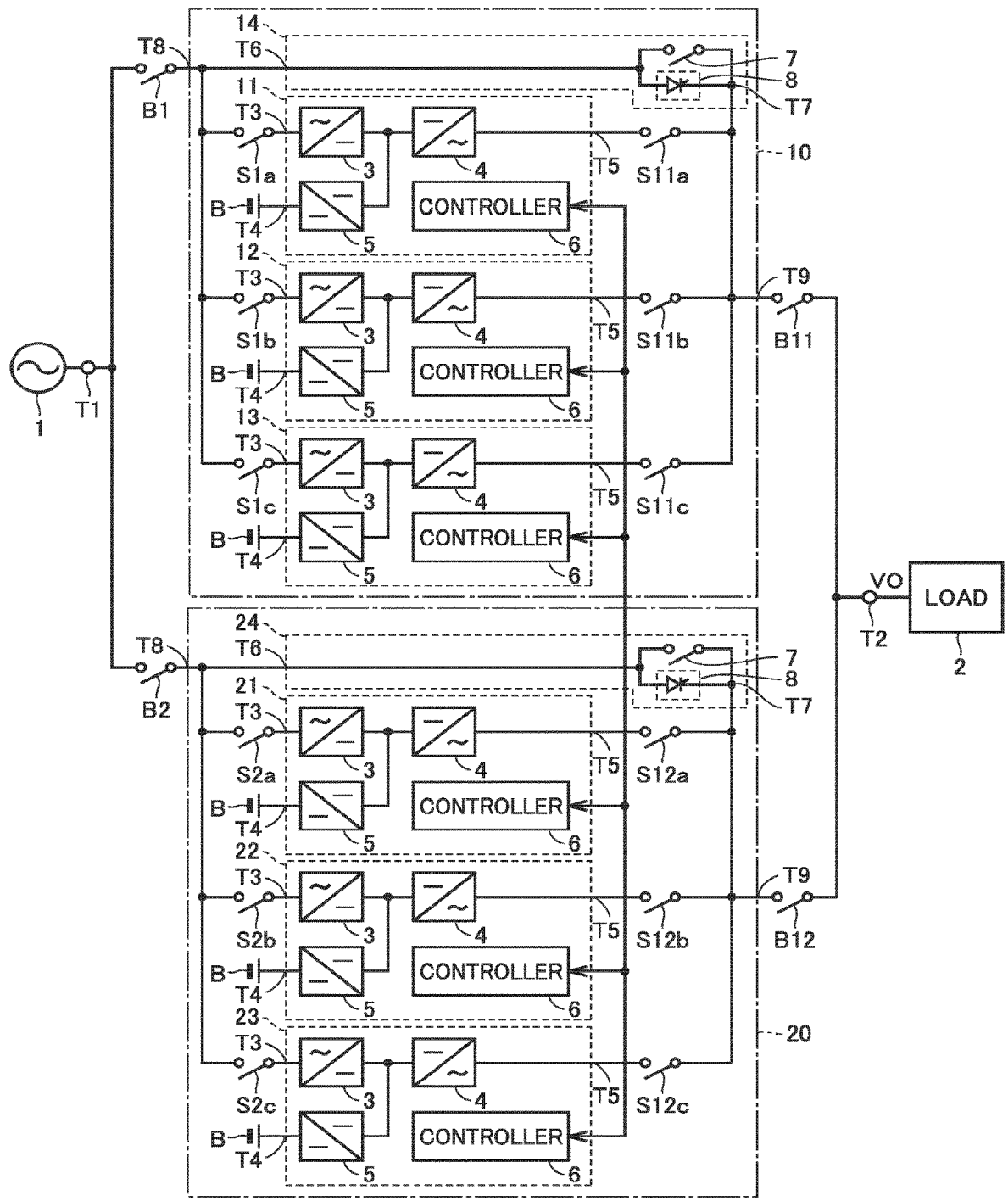
FIG. 2 is a circuit block diagram showing a configuration of each UPS module.

FIG. 2 is a circuit block diagram showing a configuration of each UPS module in the uninterruptible power supply system shown in FIG. 1. As shown in FIG. 2, UPS module 11 includes an input terminal T3, a battery terminal T4, an output terminal T5, a converter 3, an inverter 4, a chopper 5, and a controller 6. Converter 3 converts AC power supplied from AC power source 1 via input terminal T3 (first AC power), into DC power. DC power generated at converter 3 is supplied to inverter 4 and chopper 5.

Inverter 4 converts DC power into AC power having a commercial frequency (second AC power). At the time of the normal operation, chopper 5 supplies DC power generated at converter 3 to the positive electrode of battery B via battery terminal T4. At the time of power outage of AC power source 1, chopper 5 supplies DC power from battery B to inverter 4. UPS modules 12, 13 have the same configuration as UPS module 11.

Converter 3 and inverter 4 are constituted of semiconductor switching elements. Each semiconductor switching element may be, for example, an insulated gate bipolar transistor (IGBT). As a method for controlling the semiconductor switching elements, pulse width modulation (PWM) control may be used.

Each of switches S1a, S1b, S1c has one terminal connected to input terminal T8, and the other terminal connected to input terminal T3 of a corresponding one of UPS modules 11, 12, 13. Switches S1a, S1b, S1c correspond to one example of "m switches".

Each of switches S11a, S11b, S11c has one terminal connected to output terminal T9, and the other terminal connected to output terminal T5 of a corresponding one of UPS modules 11, 12, 13. Switches S11a, S11b, S11c correspond to one example of "m switches". FIG. 1 shows a case in which a switch is connected to both input terminal T8 and output terminal T9 of each UPS module. However, a switch may be connected to only one of input terminal T8 and output terminal T9. That is, a switch is simply required to be electrically connected in series to a corresponding UPS module between input terminal T8 and output terminal T9.

Bypass board 14 includes an input terminal T6, an output terminal T7, a switch 7, and a thyristor switch 8. Input terminal T6 is connected to input terminal T8, and output terminal T7 is connected to output terminal T9. Switch 7 and thyristor switch 8 are connected in parallel between input terminal T6 and output terminal T7.

Uninterruptible power supply 10 has a bypass power supply mode, in which AC power supplied from AC power source 1 via input terminal T8 is output to output terminal T9 via switch 7 and output terminal T7; and an inverter power supply mode, in which AC power generated at inverters 4 of UPS modules 11 to 13 is output to output terminal T9 via switches S11a, S11b, S11c, respectively. Switch 7 is ON during the bypass power supply mode, whereas switches S11a, S11b, S11c are ON during the inverter power supply mode. During a period of time when a switch is made between the bypass power supply mode and the inverter power supply mode, both switch S7 and switches S11a, S11b, S11e are ON. When inverters 4 of UPS modules 11 to 13 are all failed during the inverter power supply mode, thyristor switch 8 is turned on to instantaneously provide AC power from AC power source 1 to output terminal T9.

Uninterruptible power supply 20 has the same basic configuration as uninterruptible power supply 10. Specifically, uninterruptible power supply 20 includes input terminal T8, output terminal T9, m UPS modules 21 to 23, a bypass board 24, and switches S2a, S2b, S2c, S12a, S12b, S12c. In FIG. 1, uninterruptible power supply 20 includes three UPS modules 21 to 23 (m=3).

UPS modules 21 to 23 and bypass board 24 are connected in parallel between input terminal T8 and output terminal T9. UPS modules 21 to 23 have the same configuration as UPS module 11. Bypass board 24 has the same configuration as bypass board 14.

Each of switches S2a, S2b, S2c has one terminal connected to input terminal T8, and the other terminal connected to input terminal T3 of a corresponding one of UPS modules 21, 22, 23. Switches S2a, S2b, S2c correspond to one example of "m switches".

Each of switches S12a, S12b, S12c has one terminal connected to output terminal T9, and the other terminal connected to output terminal T5 of a corresponding one of UPS modules 21, 22, 23. Switches S12a, S12b, S12c correspond to one example of "m switches".

Similar to uninterruptible power supply 10, uninterruptible power supply 20 also has a bypass power supply mode, in which AC power supplied from AC power source 1 via input terminal T8 is output to output terminal T9 via switch 7 and output terminal T7; and an inverter power supply mode, in which AC power generated at inverters 4 of UPS modules 21 to 23 is output to output terminal T9 via switches S12a, S12b, S12c, respectively.

Uninterruptible power supply system 100 includes n uninterruptible power supplies 10, 20 connected in parallel (n=2 in FIG. 1). Each uninterruptible power supply includes m UPS modules (m=3 in FIG. 1) and a bypass board connected in parallel. That is, uninterruptible power supply system 100 includes n×m UPS modules.

At the time of the normal operation of uninterruptible power supply system 100, breakers B1, B2, B11, B12 are closed (ON) so that uninterruptible power supplies 10, 20 can supply load 2 with AC power having a commercial frequency.

Each of uninterruptible power supplies 10, 20 can drive load 2 with its (m−1) UPS modules. Accordingly, in FIG. 1 and FIG. 2, if one of the three UPS modules 11 to 13 (e.g., UPS module 13) is failed in one of the two uninterruptible power supplies 10, 20 (e.g., uninterruptible power supply 10), load 2 can still be driven by the remaining two UPS modules (UPS modules 11, 12 in this case) and three UPS modules 21 to 23 of uninterruptible power supply 20. That is, the failed UPS module 13 can be disconnected and maintained by turning off switches S1c, S11c, while five UPS modules 11, 12 and 21 to 23 are supplying load 2 with AC power having a commercial frequency.

The output current of each of uninterruptible power supplies 10, 20 is controlled so that a voltage VO output to output terminal T2 matches a predetermined target voltage VO*. For example, target voltage VO* is set to the rated voltage of AC power supplied from AC power source 1.

Output terminal T2 of uninterruptible power supply system 100 is electrically connected to output terminals T5 of UPS modules 11 to 13 and 21 to 23 via breakers B11, B12 and switches S11a to S11c and S21a to S21c. Accordingly, the output current of each UPS module is controlled so that the voltage of output terminal T5 (the output voltage of inverter 4) matches target voltage VO*.

Hereinafter the control of the output current in uninterruptible power supply system 100 is described in detail.

Figure 3:
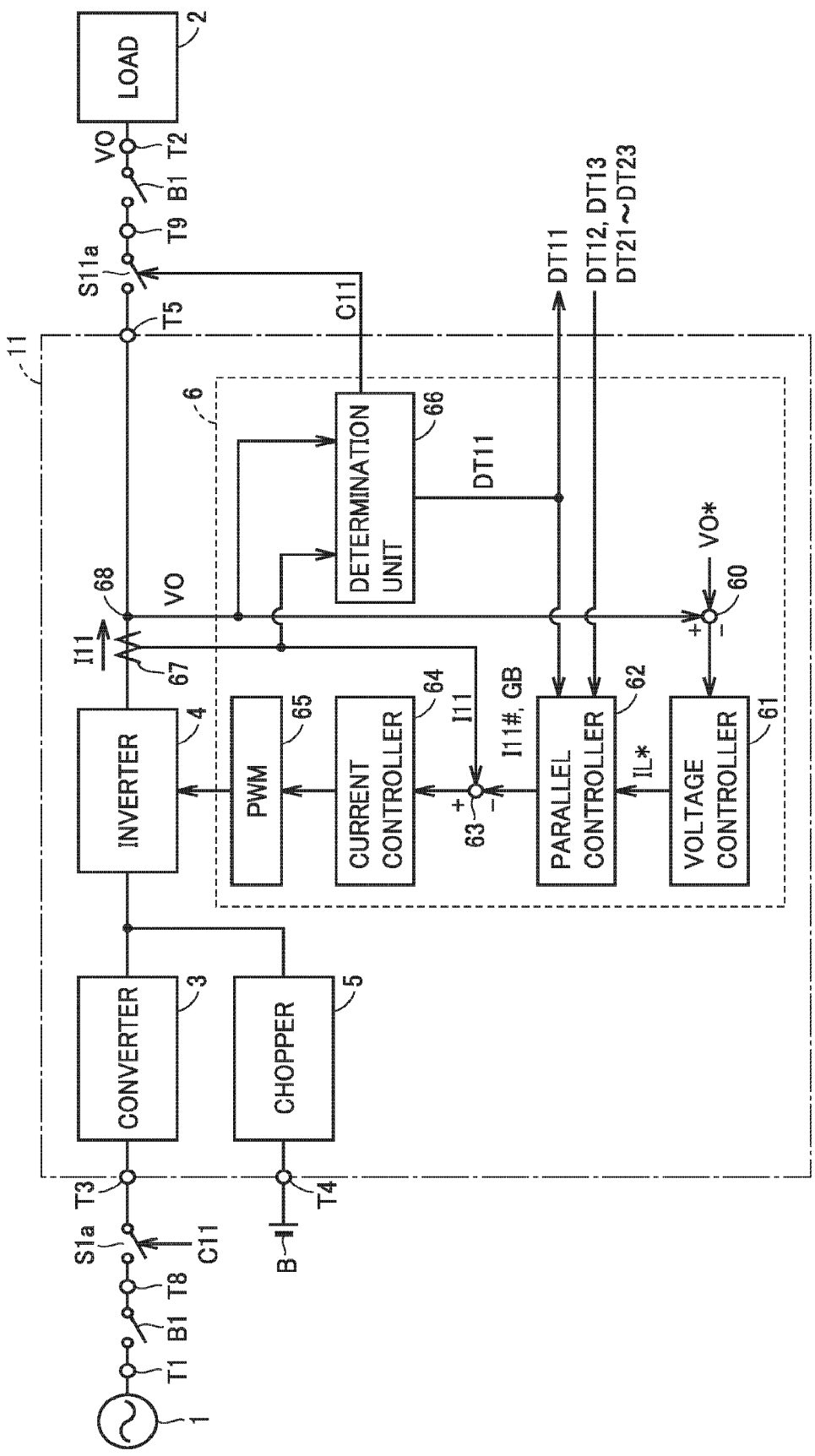
FIG. 3 is a block diagram showing a configuration of a controller of each UPS module.

FIG. 3 is a block diagram showing a configuration of controller 6 of each UPS module. FIG. 3 shows controller 6 of UPS module 11 as a representative. Controller 6 of each of UPS modules 12, 13 and 21 to 23 has the same configuration as controller 6 of UPS module 11. As described later, controllers 6 of the UPS modules are coupled to one another (see FIG. 4).

With reference to FIG. 3, in UPS module 11, controller 6 includes subtractors 60, 63, a voltage controller 61, a parallel controller 62, a current controller 64, a PWM controller 65, and a determination unit 66.

UPS module 11 further includes a current sensor 67 and a voltage sensor 68. Current sensor 67 detects an output current I11 of inverter 4 and outputs a signal indicating the detection current I11 to controller 6. Voltage sensor 68 detects an output voltage VO of inverter 4 and outputs a signal indicating the detection voltage VO to controller 6.

Determination unit 66 determines whether or not UPS module 11 is failed, based on detection current I11 from current sensor 67 and detection voltage VO from voltage sensor 68. Specifically, when detection voltage VO from voltage sensor 68 exceeds the upper limit voltage higher than target voltage VO*, or when detection current I11 from current sensor 67 exceeds the upper limit current, then determination unit 66 determines that UPS module 11 is failed.

Determination unit 66 outputs a signal indicating the determination result (hereinafter also referred to as a determination signal) DT11 to parallel controller 62. Further, determination unit 66 outputs determination signal DT11 to controller 6 of each of uninterruptible power supply modules 12, 13 and 21 to 23.

Subtractor 60 calculates the deviation VO*−VO of detection voltage VO detected by voltage sensor 68 from target voltage VO*, and outputs the calculated deviation VO*−VO to voltage controller 61.

Voltage controller 61 generates a current instruction value IL* by performing control calculation for reducing the deviation VO*−VO to zero. For example, voltage controller 61 performs proportional integral (PI) calculation to generate current instruction value IL*.

Parallel controller 62 receives determination signal DT11 from determination unit 66. Based on determination signal DT11, parallel controller 62 determines whether UPS module 11 is normal or failed. Further, parallel controller 62 receives determination signals DT12, DT13 and DT21 to DT23 sent from UPS modules 12, 13 and 21 to 23, respectively. Based on these determination signals DT11 to DT13 and DT21 to DT23, parallel controller 62 detects the number x of normal UPS modules.

As used herein, "the number x of normal UPS modules" refers to the total number of normal UPS modules in the entire uninterruptible power supply system 100. Specifically, it refers to the sum of the number of normal UPS modules in uninterruptible power supply 10 and the number of normal UPS modules in uninterruptible power supply 20. That is, the relation of 0≤x≤n×m is satisfied among x, n and m. In FIG. 1, x satisfies 0≤x≤6.

Based on current instruction value IL* and the detected number x, parallel controller 62 generates a current instruction value I # which is the target value of the output current of inverter 4 of each UPS module. Specifically, parallel controller 62 generates current instruction value I # by dividing current instruction value IL* by the number x of normal UPS modules (I #=IL*/x). In UPS module 11 shown in FIG. 3, when UPS module 11 is normal, current instruction value I11 # for UPS module 11 is I11 #=IL*/x.

Subtractor 63 calculates the deviation I11 #-I11 of detection value I11 detected by current sensor 67 from current instruction value I11 #, and outputs the calculated deviation I11 #-I11 to current controller 64.

Current controller 64 generates a voltage instruction value by performing control calculation for reducing the deviation I11 #-I11 to zero. For example, current controller 64 performs PI calculation to generate the voltage instruction value.

PWM controller 65 controls inverter 4 so that UPS module 11 outputs a voltage having a value according to the voltage instruction value from current controller 64. Thus, inverter 4 outputs a current equal to current instruction value I11 #.

On the other hand, when UPS module 11 is failed, determination unit 66 generates a control signal C11 for opening (turning off) switches S1a, S11a. By outputting control signal C11 to switches S1a, S11a, determination unit 66 disconnects UPS module 11 from uninterruptible power supply 10. When parallel controller 62 determines that UPS module 11 is failed based on determination signal DT11, parallel controller 62 outputs, to inverter 4, a gate breaking signal GB for breaking the gate of each semiconductor switching element of inverter 4. Thus, inverter 4 of UPS module 11 is stopped.

Although not shown, controller 6 controls converter 3 and chopper 5, in addition to controlling inverter 4 and switches S1a, S11a as described above. During the inverter power supply mode, at the normal time when AC power is supplied from AC power source 1, controller 6 controls converter 3 to generate DC power; whereas at the time of power outage when the supply of AC power from AC power source 1 is stopped, controller 6 controls chopper 5 to generate DC power.

Figure 4:
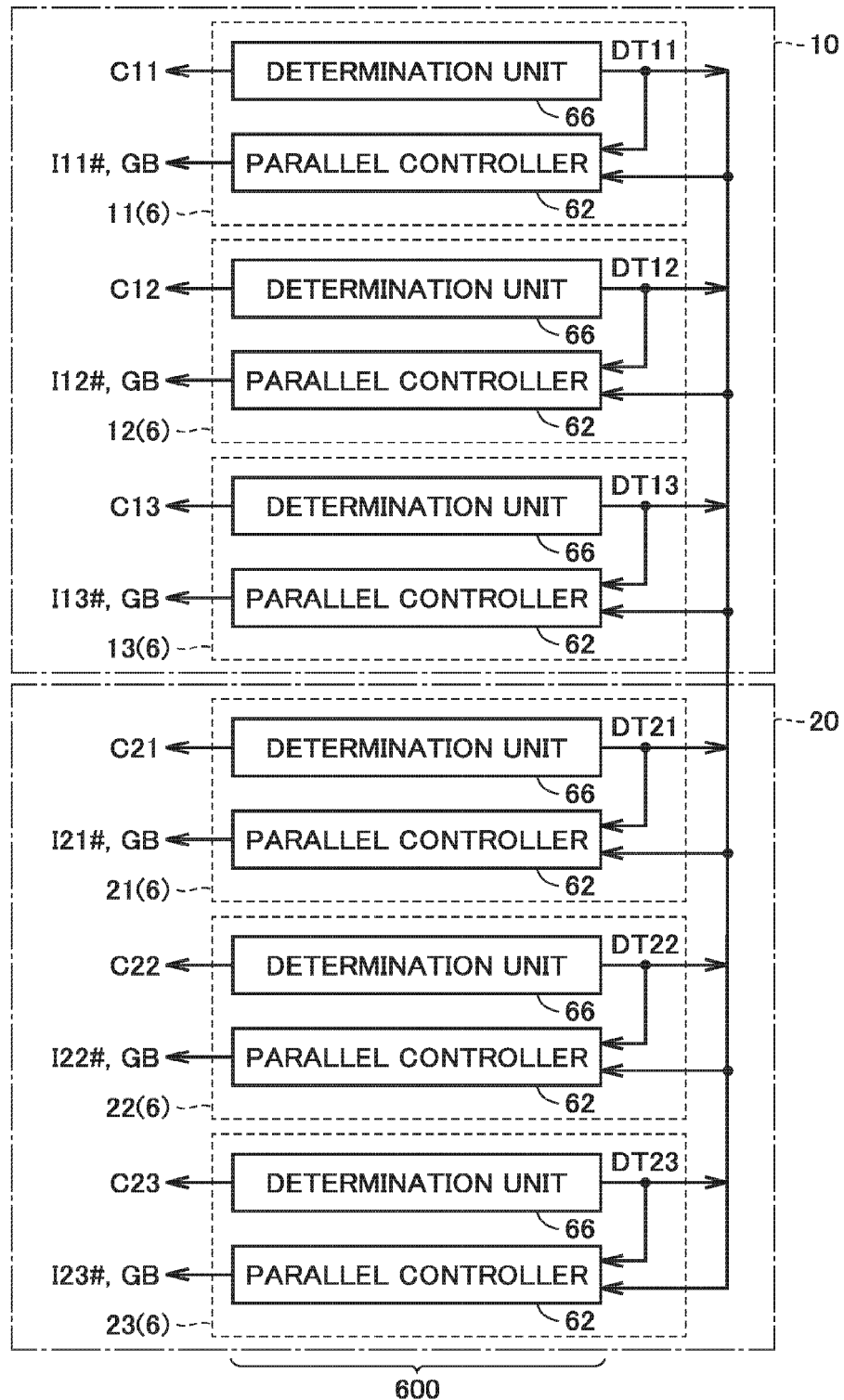
FIG. 4 is a block diagram showing a part related to the control of the uninterruptible power supply system.

FIG. 4 is a block diagram showing a part related to the control of uninterruptible power supply system 100. With reference to FIG. 4, controllers 6 of UPS modules 11 to 13 and 21 to 23 can communicate with one another. For example, controllers 6 are connected to one another via communication cables. Controllers 6 of UPS modules 11 to 13 and 21 to 23 constitute one integrated controller 600.

In integrated controller 600, each controller 6 sends a determination signal DT generated at determination unit 66 to the other five controllers 6. Each controller 6 receives determination signal DT from each of the other five controllers 6. Thus, in integrated controller 600, determination signal DT of each UPS module is shared among six controllers 6.

In each controller 6, determination unit 66 generates a control signal C for disconnecting its own UPS module, based on determination signal DT. Parallel controller 62 detects the number x of normal UPS modules, based on determination signals DT from the other five controllers 6 and based on determination signal DT from determination unit 66. As described above, parallel controller 62 generates current instruction value I # or gate breaking signal GB for its own UPS module, based on determination signals DT and the number x.

Figure 5:
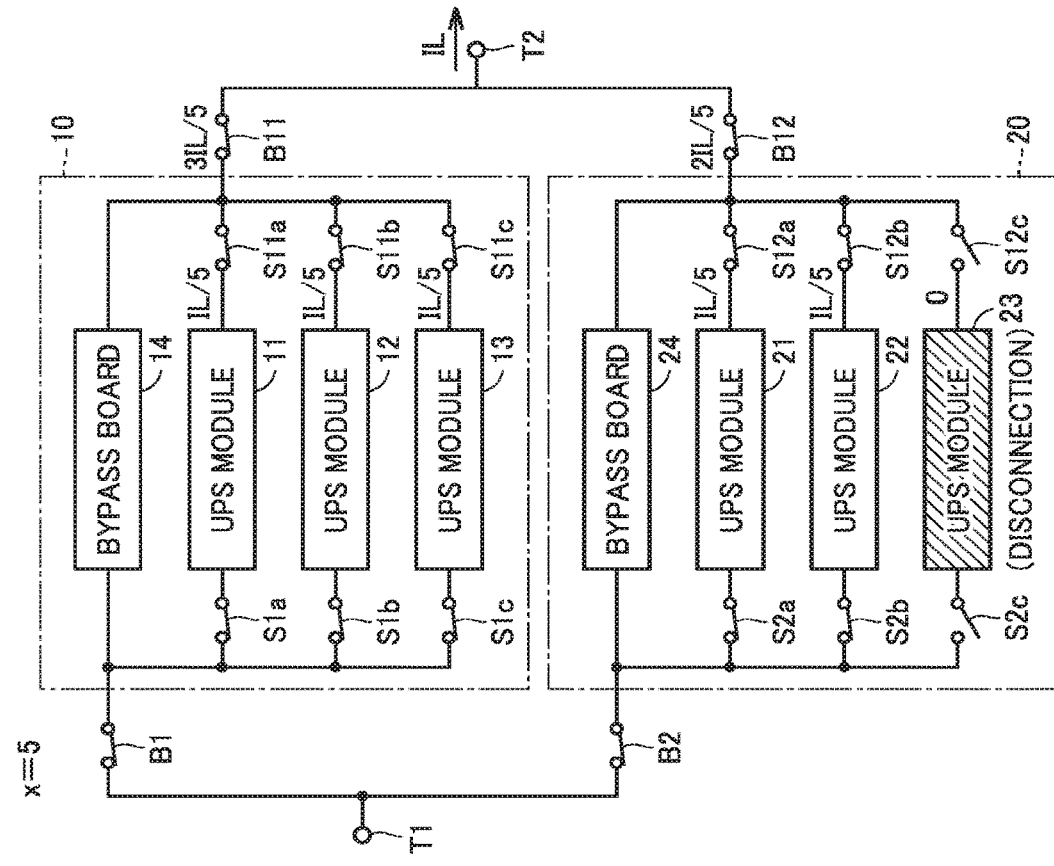
FIG. 5 is a diagram illustrating the operation of the uninterruptible power supply system according to embodiment 1, with one UPS module being failed.

Next, with reference to FIG. 5, the operation of uninterruptible power supply system 100 with one UPS module being failed is described.

With reference to FIG. 5(A), when uninterruptible power supplies 10, 20 are both normal, the number x of normal UPS modules satisfies x=6. In this case, current instruction value I # for each UPS module is set to IL*/6 (first instruction value), and inverter 4 of each UPS module is controlled in accordance with this current instruction value I #. Accordingly, the output current of each UPS module is controlled into IL/6, where IL denotes the output current of uninterruptible power supply system 100.

When UPS module 23 of uninterruptible power supply 20 is failed, controller 6 of UPS module 23 opens switches S2c, S12c to disconnect UPS module 23 and stops inverter 4 as shown in FIG. 5(B).

Accordingly, the number of normal UPS modules becomes x=5, and thus integrated controller 600 changes current instruction value I # for each UPS module to IL*/5 (second instruction value). In each of UPS modules 11 to 13, 21 and 22, inverter 4 is controlled in accordance with this changed current instruction value I # and thus the output current is increased to IL/5.

In this way, in uninterruptible power supply system 100 according to embodiment 1, when any one of the three UPS modules is failed in any one of the two uninterruptible power supplies, integrated controller 600 changes current instruction values I # for the remaining five normal UPS modules so as to equalize current instruction values I #. Thus, current instruction values I # are always equal to one another among the remaining five normal UPS modules.

Next, with reference to comparative examples, the advantageous effects of uninterruptible power supply system 100 according to embodiment 1 are described.

Figure 6:
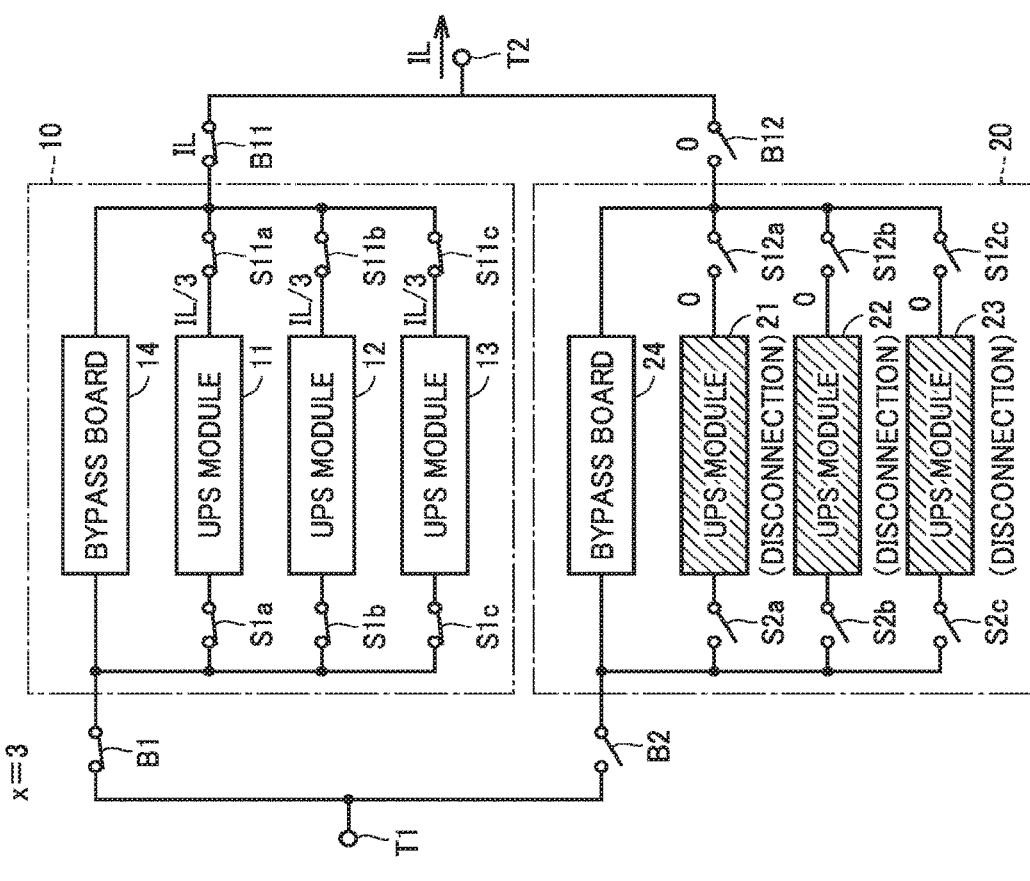
FIG. 6 is a diagram illustrating the operation of an uninterruptible power supply system according to a first comparative example, with one UPS module being failed.
Figure 6:
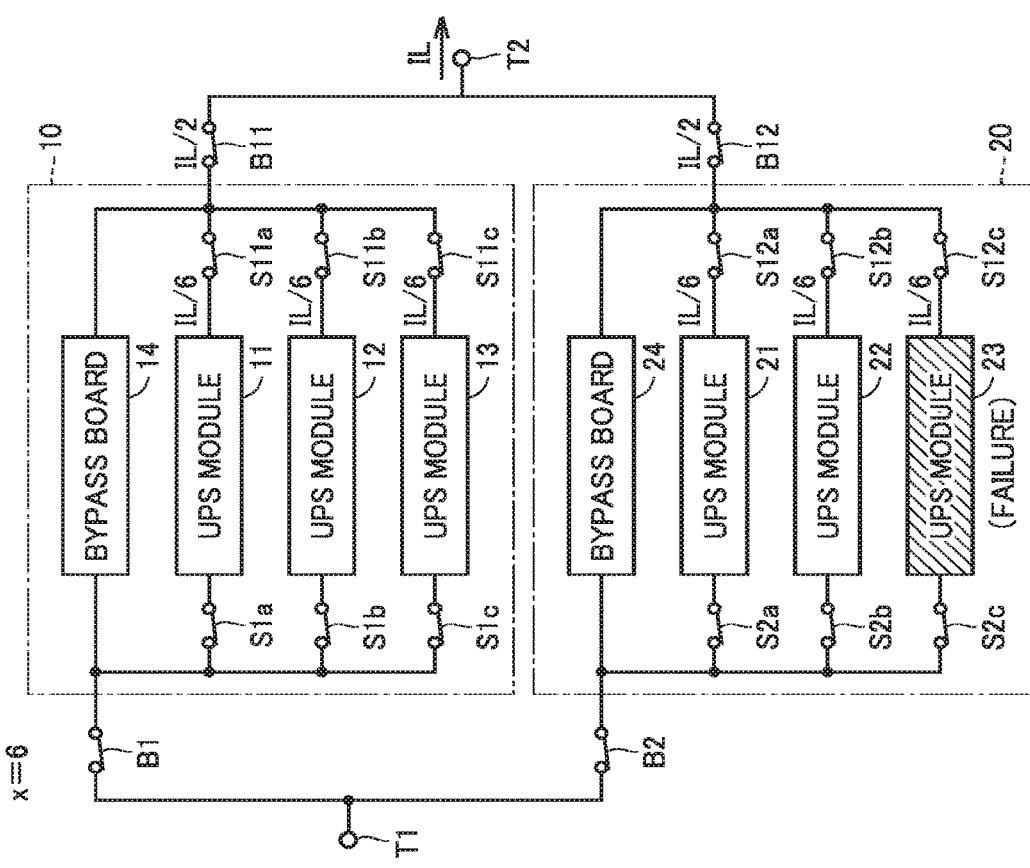

FIG. 6 shows the operation of an uninterruptible power supply system in a first comparative example. With reference to FIG. 6(A), the uninterruptible power supply system according to the first comparative example has the same circuit configuration as uninterruptible power supply system 100 shown in FIG. 5.

In the first comparative example, when UPS module 23 of uninterruptible power supply 20 is failed, breakers B2, B12 are opened to disconnect uninterruptible power supply 20 as shown in FIG. 6(B). That is, the uninterruptible power supply having the failed UPS module is disconnected. Accordingly, normal UPS modules 21, 23 included in uninterruptible power supply 20 are also disconnected and become unusable.

The disconnection of uninterruptible power supply 20 results in the number of normal UPS modules becoming x=3, and accordingly current instruction value IL # for each UPS module is changed to IL*/3. In each of UPS modules 11 to 13, inverter 4 is controlled in accordance with the changed current instruction value IL # and thus the output current is increased to IL/3.

In this way, in the uninterruptible power supply system according to the first comparative example, even if one UPS module is failed, the same current IL can continue to be supplied to the load as before the failure, as in uninterruptible power supply system 100 according to embodiment 1 (see FIG. 5(B)).

However, in uninterruptible power supply 20, UPS modules 21, 22 are also forced to be unusable though normal. That is, the normal UPS modules cannot be used effectively.

Further, the disconnection of uninterruptible power supply 20 causes an increase in current flowing through inverter 4 of each of UPS modules 11 to 13 in uninterruptible power supply 10. This may cause an increase in power loss in the entire uninterruptible power supply system, thus reducing the operation efficiency.

By contrast, in uninterruptible power supply system 100 according to embodiment 1, only a failed UPS module is disconnected as described in FIG. 5(B), and thus all the remaining normal UPS modules can be used to supply power to load 2. Accordingly, uninterruptible power supply system 100 can minimize the increase in current flowing through inverter 4 of each UPS module that might be caused by the disconnection of the failed UPS module. Thus, uninterruptible power supply system 100 can minimize the increase in power loss.

Figure 7:
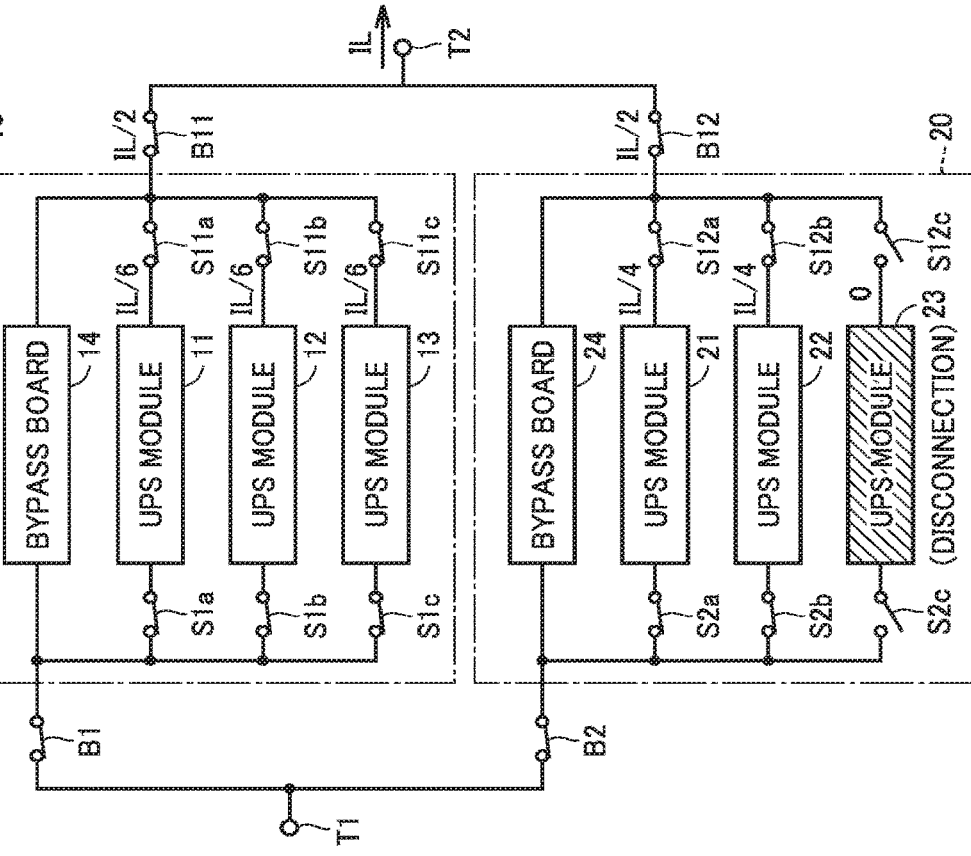
FIG. 7 is a diagram illustrating the operation of an uninterruptible power supply system according to a second comparative example, with one UPS module being failed.
Figure 7:
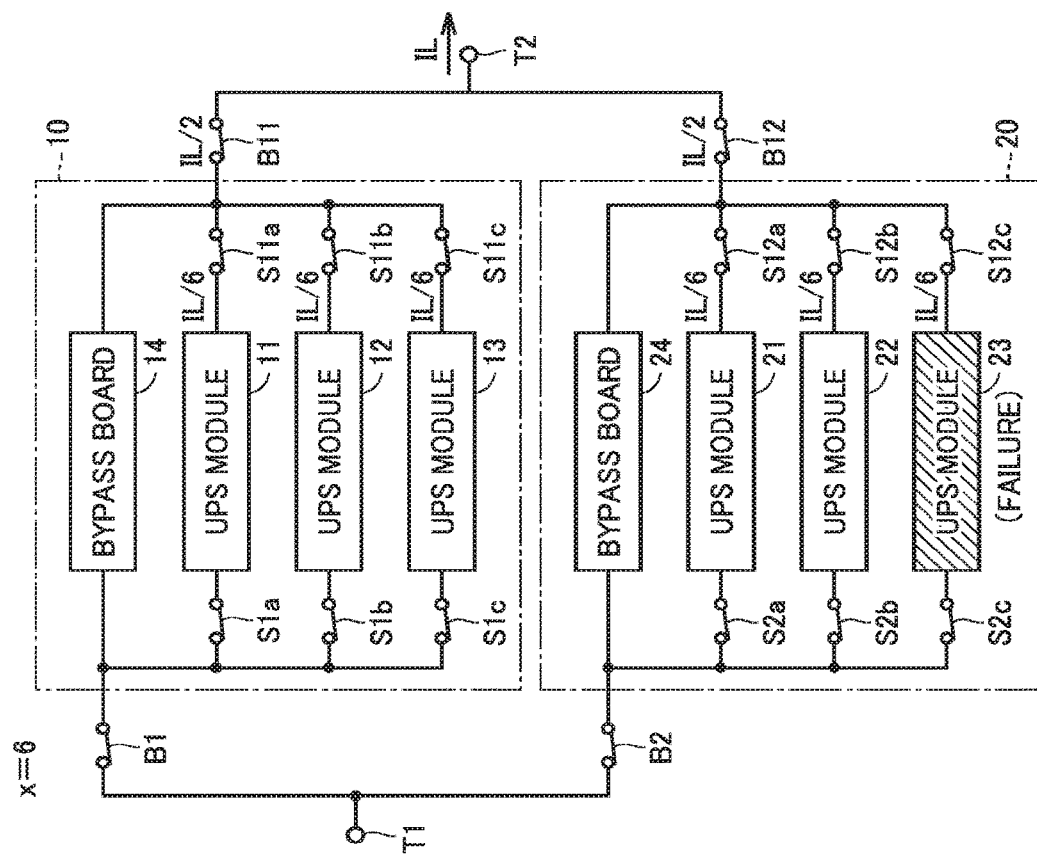

FIG. 7 shows the operation of an uninterruptible power supply system in a second comparative example. With reference to FIG. 7(A), the uninterruptible power supply system according to the second comparative example has the same configuration as uninterruptible power supply system 100 shown in FIG. 5.

In the second comparative example, when UPS module 23 of uninterruptible power supply 20 is failed, switches S2c, S12c are opened to disconnect UPS module 23 as shown in FIG. 7(B). At this time, the remaining five normal UPS modules 11 to 13, 21 and 22 can be used to supply current IL to the load.

In the second comparative example, in uninterruptible power supply 20, the output current of each of normal UPS modules 21, 22 is changed from IL/6 to IL/4 in response to the disconnection of UPS module 23. This allows the output current of uninterruptible power supply 20 to be maintained at IL/2 after UPS module 23 is disconnected. On the other hand, in uninterruptible power supply 10, the output current of each UPS module remains IL/6.

In the uninterruptible power supply system according to the second comparative example, even if one UPS module is failed, the same current IL can continue to be supplied to the load as before the failure, as in uninterruptible power supply system 100 according to embodiment 1 (see FIG. 5(B)).

In the second comparative example, however, while the output current of each of UPS modules 21, 22 is increased to IL/4 so as to maintain the output current of uninterruptible power supply 20 at IL/2, the output current of each of UPS modules 11 to 13 in uninterruptible power supply 10 remains IL/6. This may cause variations in inverter 4 current control between UPS modules 21, 22 and UPS modules 11 to 13.

Specifically, for UPS module 21, current instruction value I22 # is changed from IL*/6 to IL*/4, thereby increasing the deviation I22 #-I22 of detection current value I22 from current instruction value I22 #. This causes the generation of a voltage instruction value for reducing the increased deviation to zero, so that inverter 4 is controlled in accordance with this voltage instruction value. For UPS module 22, the same control as that for UPS module 21 is performed.

On the other hand, for UPS modules 11 to 13, current instruction value I # remains IL/6*, with no increase in the deviation of the detection current value from current instruction value I #.

As a result, at the timing when current instruction value I # is changed, the current control for UPS modules 21, 22 becomes unstable, and output voltage VO of uninterruptible power supply 20 may drop below voltage instruction value VO*. If this happens, a difference in output voltage will arise between uninterruptible power supply 10 and uninterruptible power supply 20, thus possibly causing a cross-current to flow between uninterruptible power supply 10 and uninterruptible power supply 20.

By contrast, in uninterruptible power supply system 100 according to embodiment 1, current instruction values I # for UPS modules 11 to 13, 21 and 22 are changed to be equalized with one another, as shown in FIG. 5(B). Accordingly, after a UPS module is failed, in a plurality of normal UPS modules, inverters 4 are controlled in accordance with current instruction values I # that are always equal to one another. This can minimize the variations in current control, and thus the variations in output voltage, among the plurality of UPS modules. Accordingly, even if a UPS module is failed, uninterruptible power supply system 100 can minimize the occurrence of cross-current and can stably supply power to load 2.

Figure 8:
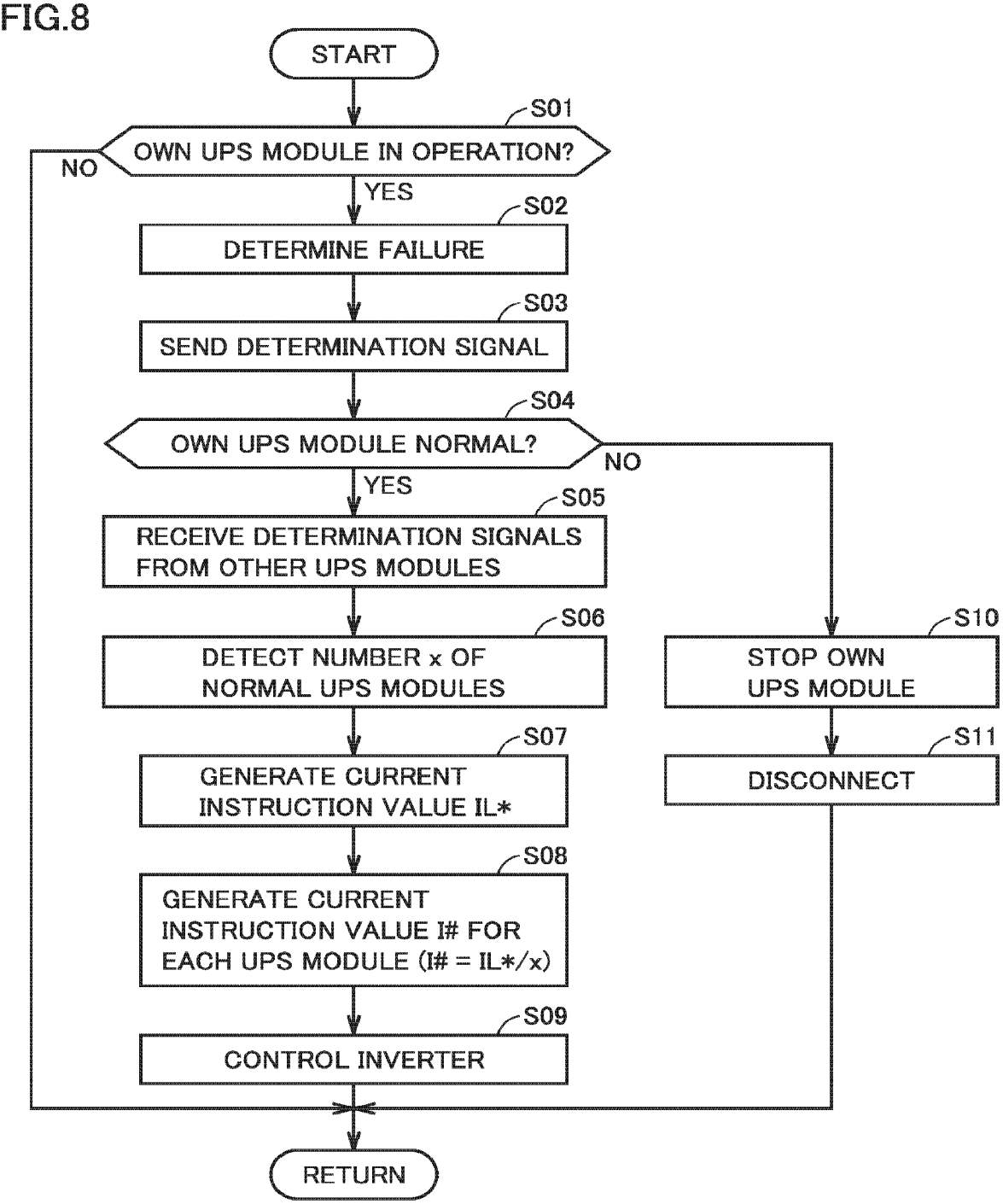
FIG. 8 is a flowchart for describing the control procedure in each UPS module of the uninterruptible power supply system according to embodiment 1.

FIG. 8 is a flowchart for describing the control procedure in each UPS module of uninterruptible power supply system 100 according to embodiment 1. Each of the processes of the flowcharts in and after FIG. 8 is called from the main routine to be executed by controller 6 of each UPS module (integrated controller 600) every prescribed time or every time a prescribed condition is satisfied.

With reference to FIG. 8, by step S01, controller 6 determines whether or not its own UPS module is in operation. When the semiconductor switching elements of inverter 4 are in the gate breaking state, controller 6 determines that its own UPS module is in the stopped state (NO at S01) and ends the process.

On the other hand, when controller 6 determines that its own UPS module is in operation (YES at S01), controller 6 determines, by step S02, whether or not a UPS module is failed based on the detection current from current sensor 67 and the detection voltage from voltage sensor 68. By step S03, controller 6 sends a determination signal indicating the determination result to controllers 6 of the other UPS modules.

By step S04, controller 6 determines whether or not its own UPS module is normal, based on the determination signal. When its own UPS module is not normal, that is, its own UPS module is failed (NO at S04), then controller 6 goes on to step S10 to stop its own UPS module. By step S11, controller 6 further disconnects its own UPS module.

On the other hand, when its own UPS module is normal (YES at S04), controller 6 receives, by step S05, the determination signals from the other UPS modules. Controller 6 then goes on to step S06 to detect the number x of normal UPS modules based on the received determination signals.

By step S07, controller 6 generates current instruction value IL*. By step S08, controller 6 further generates current instruction value I # for each of the normal UPS modules by dividing current instruction value IL* by the number x of normal UPS modules (I #=IL*/x).

By step S09, controller 6 controls inverter 4 so that the output current matches current instruction value I #.

As described above, according to the uninterruptible power supply system in embodiment 1, when one of the m UPS modules connected in parallel is failed in any one of the n uninterruptible power supplies connected in parallel, current instruction values I # for the remaining normal UPS modules are changed to be equalized with one another. By doing so, after a failure has occurred, the remaining normal UPS modules can be fully used, thus allowing efficient power supply to the load. Further, this system can minimize the variations in output current control among the remaining normal UPS modules. This allows stable power supply to the load, with minimized cross-current that might be caused by output voltage differences.

In the uninterruptible power supply system according to embodiment 1, the number n of uninterruptible power supplies and the number m of UPS modules may be any number equal to or greater than two. That is, the uninterruptible power supply system according to embodiment 1 can be generalized to the configuration shown in FIG. 9.

Figure 9:
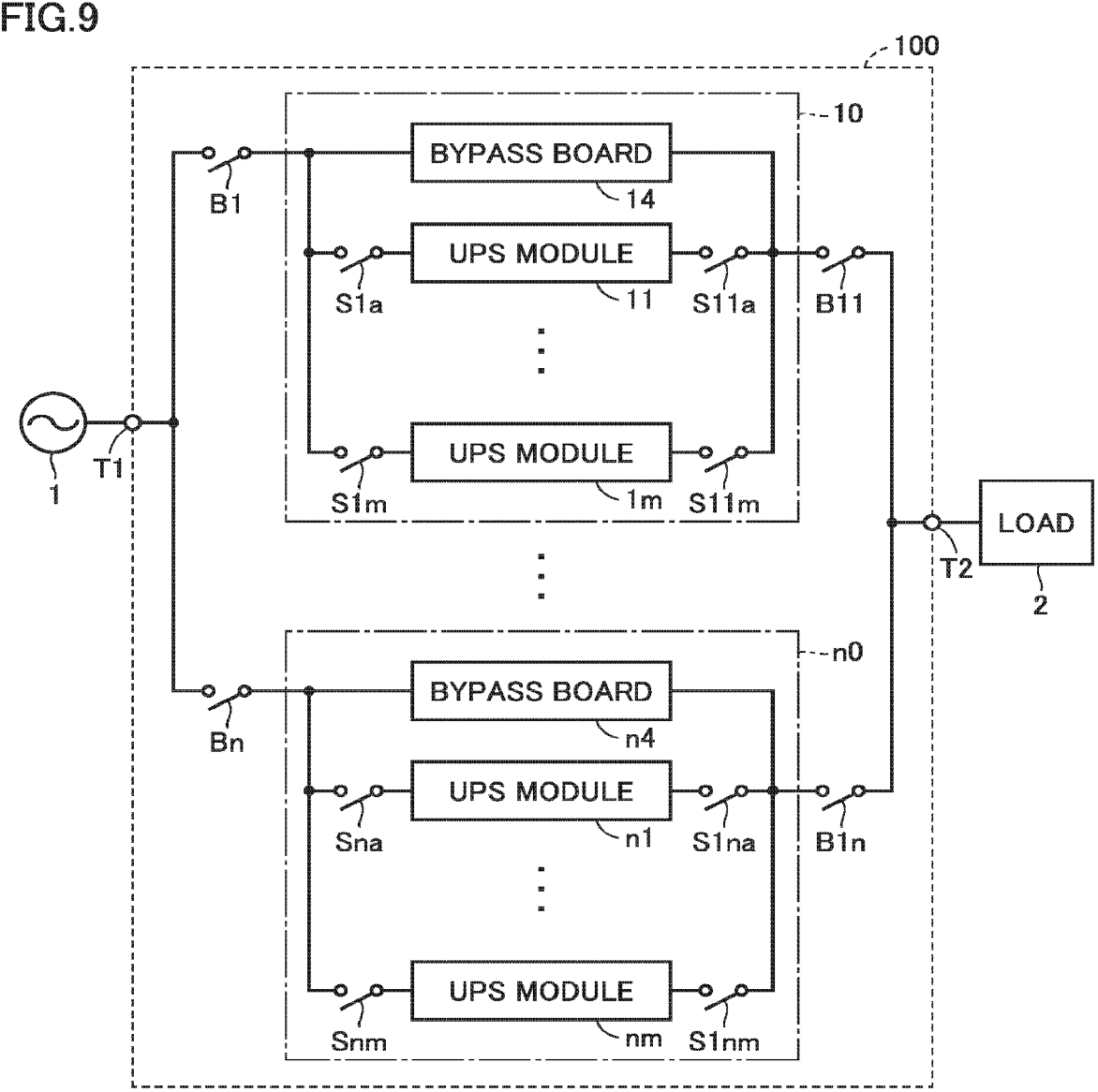
FIG. 9 is a circuit block diagram showing another configuration of the uninterruptible power supply system according to embodiment 1 of the present invention.

Specifically, with reference to FIG. 9, uninterruptible power supply system 100 includes n uninterruptible power supplies 10 to n0 connected in parallel between input terminal T1 and output terminal T2. Each of n uninterruptible power supplies 10 to n0 includes m UPS modules and a bypass board connected in parallel.

Figure 10:
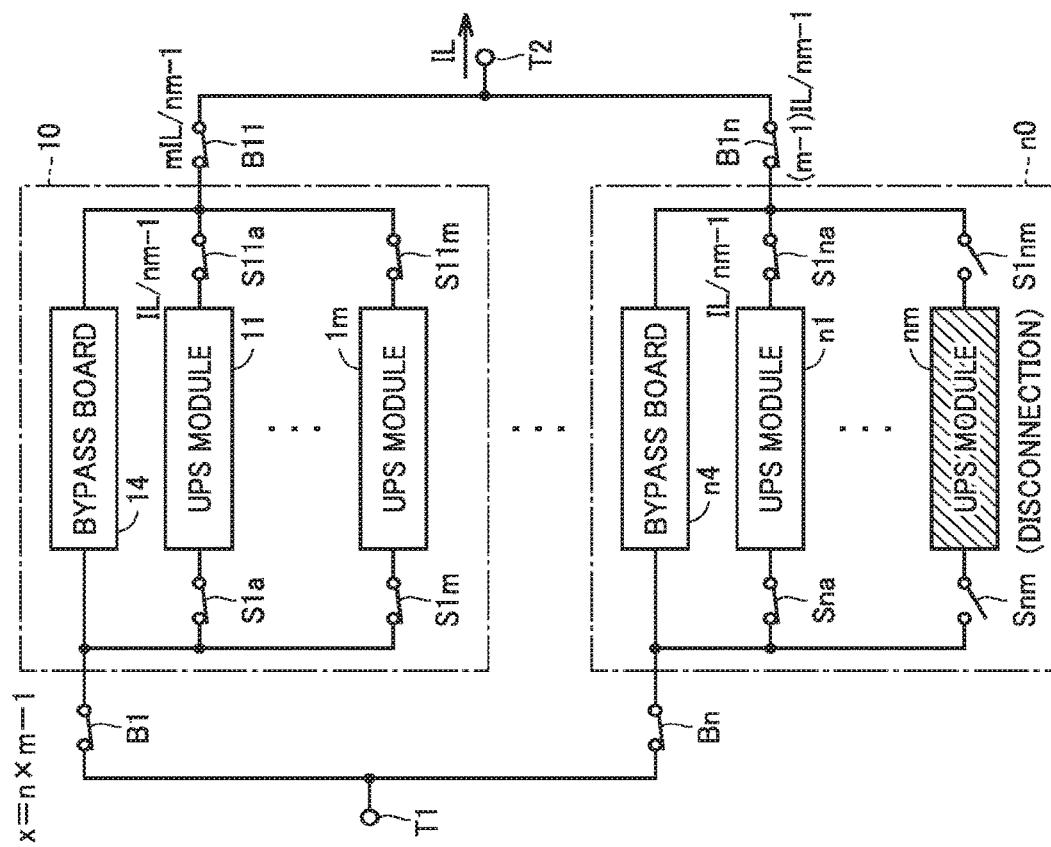
FIG. 10 is a diagram illustrating the operation of the uninterruptible power supply system according to embodiment 1, with one UPS module being failed.
Figure 10:
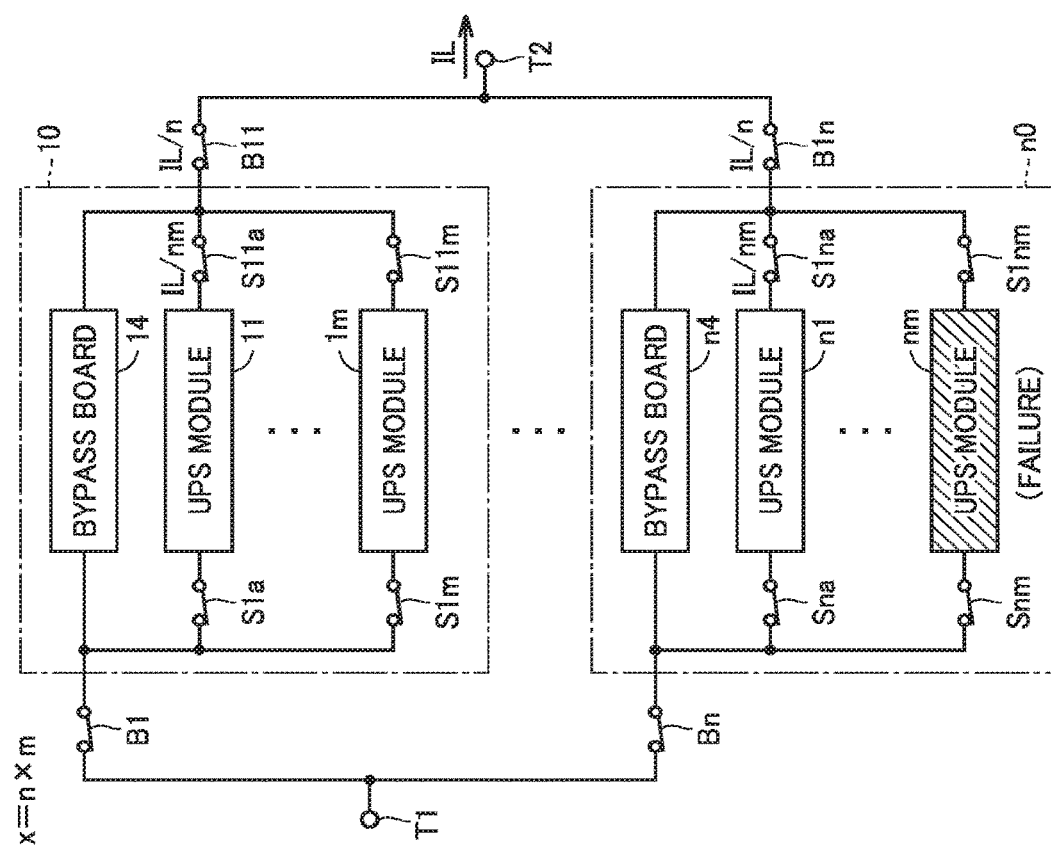

As shown in FIG. 10(A), when the n×m UPS modules are all normal, the output current of inverter 4 of each UPS module is controlled into IL/(n×m). The current instruction value I #=IL/(n×m) for each UPS module corresponds to the "first instruction value" in the present invention.

On the other hand, when one of the m UPS modules (e.g., UPS module nm) is failed in one of the n uninterruptible power supplies (e.g., uninterruptible power supply n0) as shown in FIG. 10(B), then UPS module nm is disconnected and the output current of each of the remaining (n×m−1) normal UPS modules is controlled into IL/(n×m−1). The current instruction value I #=IL/(n×m−1) for each UPS module corresponds to the "second instruction value" in the present invention.

Embodiment 2

Embodiment 2 describes a variation of the operation of uninterruptible power supply system 100 according to embodiment 1. The uninterruptible power supply system according to embodiment 2 has the same configuration as uninterruptible power supply system 100 shown in FIG. 1.

Figure 11:
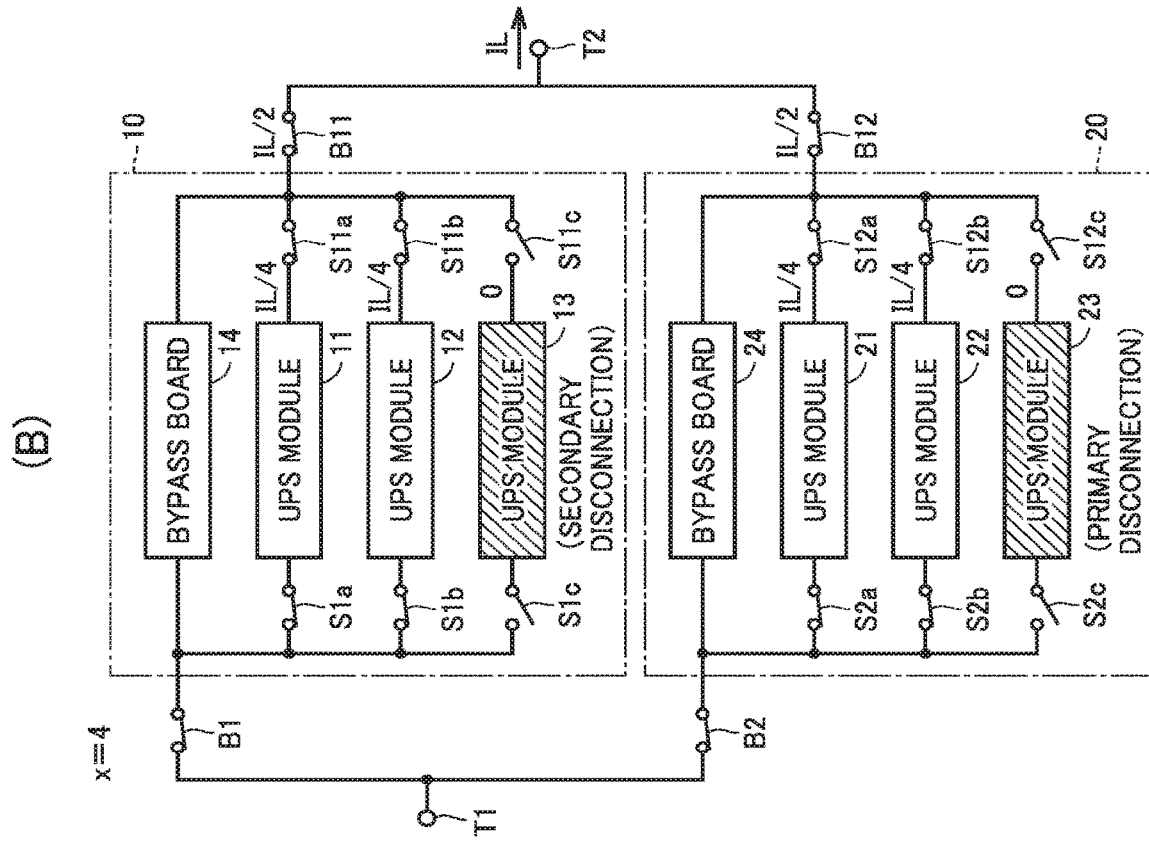
FIG. 11 is a diagram illustrating the operation of an uninterruptible power supply system according to embodiment 2, with one UPS module being failed.
Figure 11:
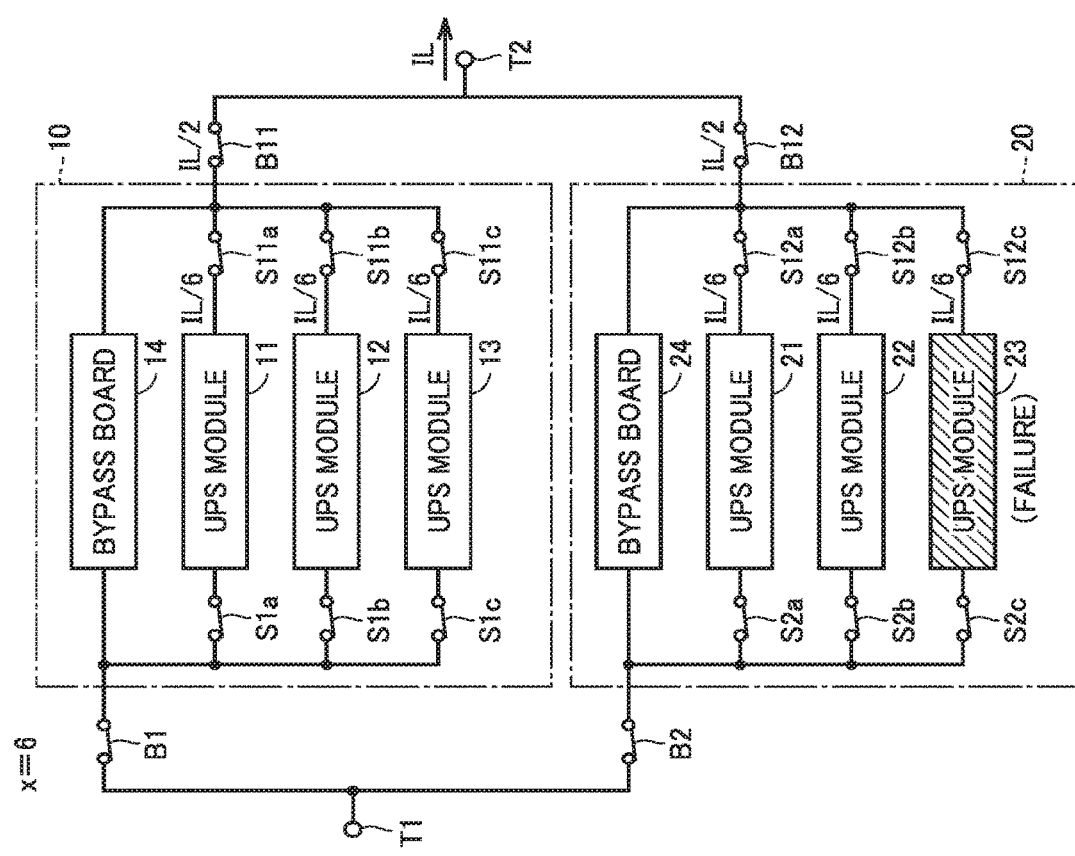

With reference to FIG. 11, the operation of the uninterruptible power supply system according to embodiment 2 with one UPS module being failed is described.

The configuration shown in FIG. 11(A) is the same as that in FIG. 5(A). That is, when uninterruptible power supplies 10, 20 are both normal, the output current of each UPS module is controlled into IL/6, where IL denotes the output current of the uninterruptible power supply system.

When UPS module 23 of uninterruptible power supply 20 is failed, controller 6 of UPS module 23 opens switches S2c, S12c to disconnect UPS module 23 and stops inverter 4 as shown in FIG. 11(B).

Further, in the uninterruptible power supply system according to embodiment 2, controller 6 of one of the three UPS modules 11 to 13 of uninterruptible power supply 10 (e.g., UPS module 13) opens switches S1c, S11c to disconnect UPS module 13. That is, when one UPS module 23 is failed in uninterruptible power supply 20, then not only UPS module 23 but also one UPS module 13 in uninterruptible power supply 10 is disconnected.

In FIG. 11(B), the disconnection of a failed UPS module is referred to as "primary disconnection", and the disconnection of a UPS module caused by the primary disconnection is referred to as "secondary disconnection". In embodiment 2, when a UPS module(s) is primarily disconnected in any one of uninterruptible power supplies 10, 20, a UPS module(s) in the other uninterruptible power supply is secondarily disconnected, the number of the secondarily disconnected UPS module(s) being the same as the number of the primarily disconnected UPS module(s). Thus, in the uninterruptible power supply system after the primary and secondary disconnections, uninterruptible power supply 10 and uninterruptible power supply 20 include the same number of normal UPS modules.

By doing so, after the failure of UPS module 23, the number x of normal UPS modules becomes x=4. Accordingly, current instruction value I # for each UPS module is changed to IL*/4 (second instruction value), and inverter 4 of each of UPS modules 11, 12, 21, 22 is controlled in accordance with the changed current instruction value I #. Thus, the output current of each of UPS modules 11, 12, 21, 22 is controlled into IL/4, where IL denotes the output current of uninterruptible power supply system 100.

According to the uninterruptible power supply system in embodiment 2, as in the uninterruptible power supply system according to embodiment 1, when one UPS module is failed, then the primary and secondary disconnections are performed, and current instruction values I # for the remaining normal UPS modules are changed to be equalized with one another. Thus, the same advantageous effects as those of embodiment 1 can be obtained.

Further, in the uninterruptible power supply system according to embodiment 2, when one UPS module is failed, the primary and secondary disconnections are performed so that uninterruptible power supplies 10, 20 include the same number of available UPS modules. Accordingly, the output current of each of uninterruptible power supplies 10, 20 is maintained at IL/2. That is, the output current of each uninterruptible power supply is always controlled into IL/2.

Figure 12:
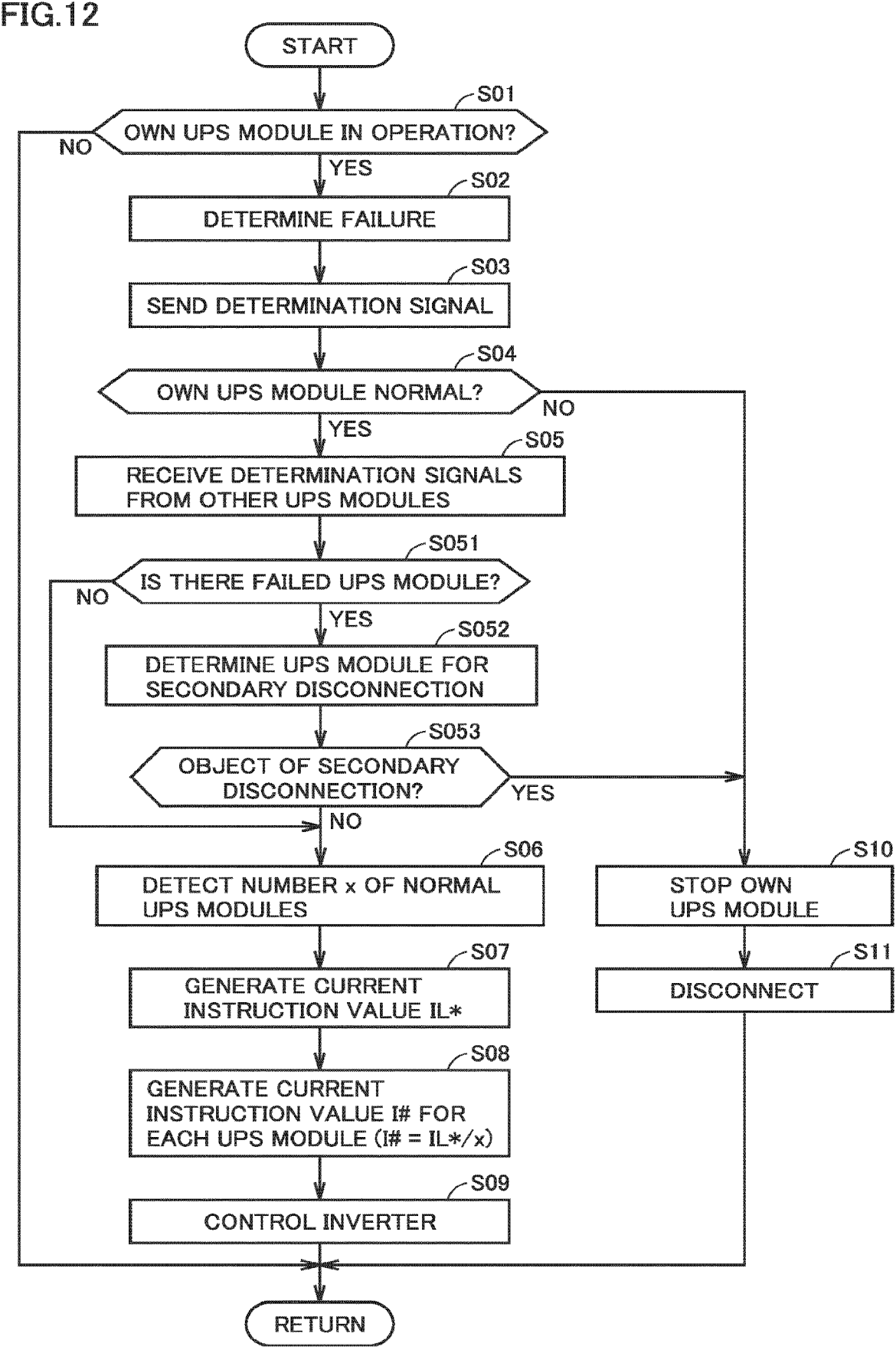
FIG. 12 is a flowchart for describing the control procedure in each UPS module of the uninterruptible power supply system according to embodiment 2.

FIG. 12 is a flowchart for describing the control procedure in each UPS module of the uninterruptible power supply system according to embodiment 2.

With reference to FIG. 12, controller 6 executes steps S01 to S05 identical to those in FIG. 8, so as to determine the presence of a failure in its own UPS module and receive determination signals DT from the other UPS modules.

By step S051, controller 6 determines whether or not there is a failed UPS module among UPS modules 11 to 13 and 21 to 23, based on the received determination signals DT. When there is a failed UPS module (YES at S051), controller 6 goes on to step S052 to determine a UPS module for secondary disconnection. At step S052, in accordance with a preset condition, a UPS module to be disconnected is determined in an uninterruptible power supply other than the uninterruptible power supply that includes the failed UPS module. For example, when the third UPS module 23 from bypass board 24 is failed (see FIG. 11B), the third UPS module 13 from bypass board 14 in uninterruptible power supply 10 is determined as a UPS module for secondary disconnection.

By step S053, controller 6 determines whether or not its own UPS module is a UPS module for secondary disconnection. When its own UPS module is a UPS module for secondary disconnection (YES at S053), controller 6 goes on to step S10 to stop its own UPS module. Further, by step S11, controller 6 disconnects its own UPS module.

On the other hand, when its own UPS module is not a UPS module for secondary disconnection (NO at S053), controller 6 executes steps S06 to S11 identical to those in FIG. 8 to control each inverter 4 so that a current having a value according to current instruction value I # is output from the UPS module.

As described above, according to the uninterruptible power supply system in embodiment 2, when one of the m UPS modules connected in parallel is failed in any one of the n uninterruptible power supplies connected in parallel, current instruction values I # for the remaining normal UPS modules are changed to be equalized with one another, as in the uninterruptible power supply system according to embodiment 1. By doing so, after a failure has occurred, the remaining normal UPS modules can be used, thus allowing efficient power supply to the load. Further, this system can minimize the variations in output current control among the remaining normal UPS modules, thus allowing stable power supply to the load.

Figure 13:
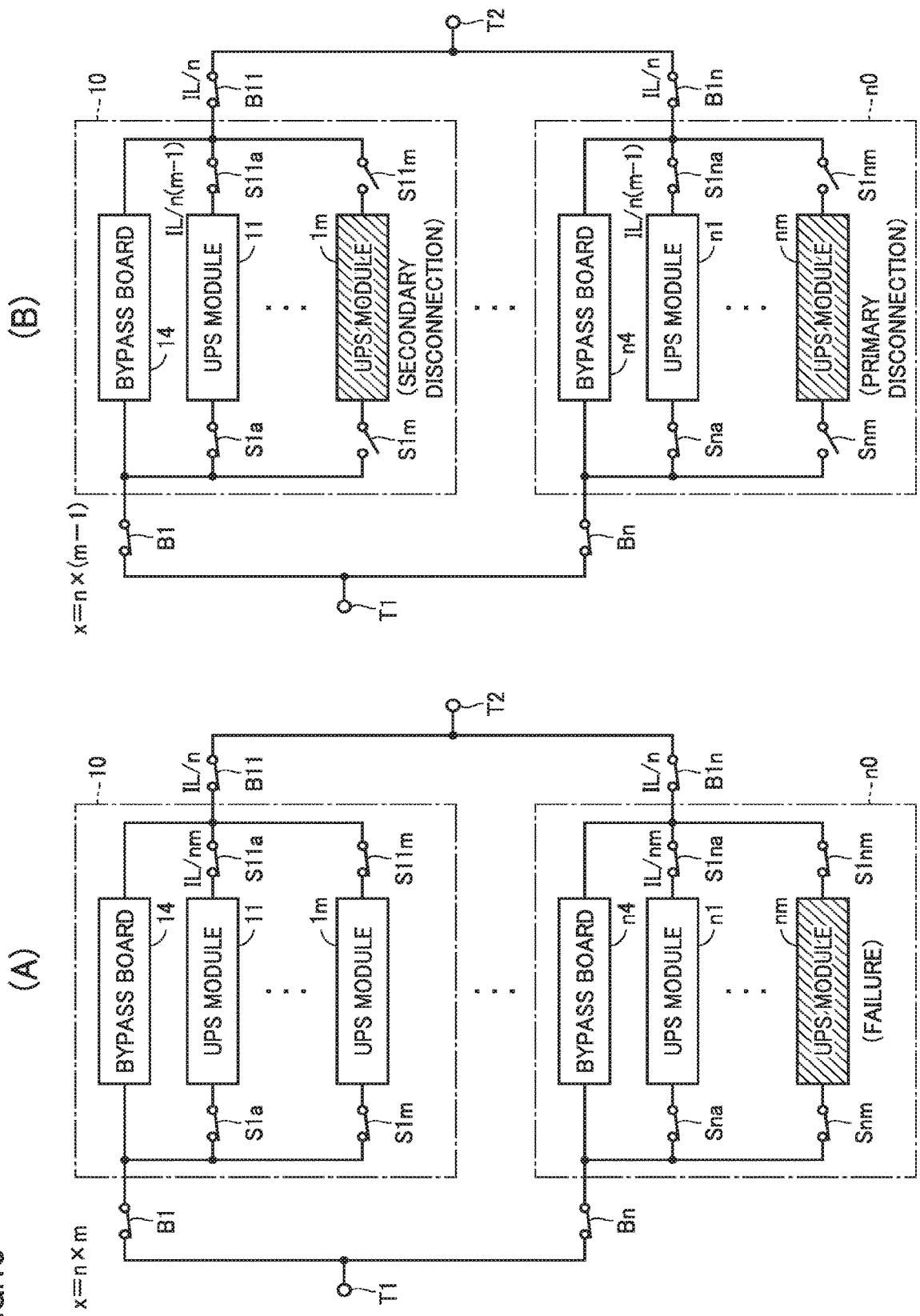
FIG. 13 is a diagram illustrating the operation of the uninterruptible power supply system according to embodiment 2 of the present invention, with one UPS module being failed.

In the uninterruptible power supply system according to embodiment 2, the number n of uninterruptible power supplies and the number m of UPS modules may be any number equal to or greater than two. That is, the uninterruptible power supply system according to embodiment 2 can be generalized to the configuration shown in FIG. 13.

In FIG. 13(A), each of the n uninterruptible power supplies includes m UPS modules connected in parallel. When the n×m UPS modules are all normal, the output current of inverter 4 of each UPS module is controlled into IL/(n×m). The current instruction value I #=IL/(n×m) for each UPS module corresponds to the "first instruction value" in the present invention.

When one of them UPS modules (e.g., UPS module nm) is failed in one of the n uninterruptible power supplies (e.g., uninterruptible power supply n0) as shown in FIG. 13(B), then UPS module nm is primarily disconnected and one UPS module is secondarily disconnected in each of the remaining (n−1) uninterruptible power supplies. Accordingly, the output current of each of the remaining n×(m−1) normal UPS modules is controlled into IL/{n×(m−1)}. The current instruction value I #=IL/{n×(m−1)} for each UPS module corresponds to the "second instruction value" in the present invention.

As seen from FIG. 13(A), (B), in the uninterruptible power supply system according to embodiment 2, the output current of each uninterruptible power supply is maintained at IL/n, regardless of the presence or absence of a failure in a UPS module. Accordingly, each uninterruptible power supply can generate output current instruction value I # for each UPS module without recognizing the number x of normal UPS modules in the entire uninterruptible power supply system. For example, when one UPS module is failed in one of the n uninterruptible power supplies, each uninterruptible power supply can easily generate output current instruction value I # by dividing its own output current IL/n by (m−1).

The embodiments disclosed herein should be considered illustrative in all respects, not limitative. It is intended that the scope of the present invention is defined not by the above description but by the terms of the claims, and that the scope of the present invention includes any modification in the meaning and scope equivalent to the terms of the claims.

REFERENCE SIGNS LIST

1: AC power source; 2: load; 3: converter; 4: inverter; 5: chopper; 6: controller; 8: thyristor switch; 10, 20, n0: uninterruptible power supply; 11 to 13, 1m, 21 to 23, nm: UPS module; 14, 24, n4: bypass board; 60, 63: subtractor; 61: voltage controller; 62: parallel controller; 64: current controller; 65: PWM controller; 66: determination unit; 100: uninterruptible power supply system; 600: integrated controller; B1, B2, B11, B12, Bn, B1n: breaker; 7, S1a to S1c, S1m, S2a to S2c, S11a to S11c, S11m, S12a to S12c, Sna to Snm, S1na to S1nm: switch; T1, T3, T8: input terminal; T2, T5, T7, T9: output terminal; T4: battery terminal; B: battery

The invention claimed is:

1. An uninterruptible power supply system comprising n uninterruptible power supplies connected in parallel, where n is an integer of two or more, each of the uninterruptible power supplies comprising:
an input terminal that receives first AC power from an AC power source;
an output terminal connectable to a load;
m uninterruptible power supply modules connected in parallel between the input terminal and the output terminal, where m is an integer of two or more; and
m switches each connected in series to a corresponding one of the m uninterruptible power supply modules between the input terminal and the output terminal,
each of the uninterruptible power supply modules including:
a converter that converts the first AC power supplied from the AC power source, into DC power;
an inverter that converts the DC power into second AC power, and supplies the second AC power to the output terminal; and
a controller that controls the inverter so that a current value of the second AC power supplied from the inverter to the output terminal matches a first instruction value, wherein
the n×m controllers are connected to one another to constitute an integrated controller, and
when a failure is detected in one of the m uninterruptible power supply modules in any one of the n uninterruptible power supplies, the integrated controller
opens the switch connected to the uninterruptible power supply module having the failure, and
changes the first instruction value to a second instruction value so as to equalize the current value of the second AC power with each other among remaining normal uninterruptible power supply modules of the uninterruptible power supply modules,
wherein the controller determines whether or not the one of the m uninterruptible power supply modules has failed based on the current value of the second AC power,
wherein the integrated controller:
generates a current instruction value so that a voltage value of the second AC power matches a target voltage,
generates the first instruction value by dividing the current instruction value by n×m, and
when a failure is detected in one of the m uninterruptible power supply modules in any one of the n uninterruptible power supplies:
additionally opens the switch connected to one of the m uninterruptible power supply modules in each of remaining n−1 uninterruptible power supplies, and
generates the second instruction value by dividing the current instruction value by n×(m−1).

2. The uninterruptible power supply system according to claim 1, wherein each of the n uninterruptible power supplies further includes a bypass board connected in parallel to the m uninterruptible power supply modules between the input terminal and the output terminal.

* * * * *